(12) United States Patent
Gao et al.

(10) Patent No.: US 8,337,223 B2
(45) Date of Patent: Dec. 25, 2012

(54) MINI-SIM CONNECTOR

(75) Inventors: Zheng Gao, San Jose, CA (US);
Benjamin Rappoport, San Francisco, CA (US); Steve McClure, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/895,071

(22) Filed: Sep. 30, 2010

(65) Prior Publication Data

US 2012/0083145 A1 Apr. 5, 2012

(51) Int. Cl.
*H01R 13/62* (2006.01)
(52) U.S. Cl. ......................................... 439/159; 439/630
(58) Field of Classification Search .................... 439/55, 439/159, 569–573, 630
See application file for complete search history.

(56) References Cited

U.S. PATENT DOCUMENTS

| | | | | |
|---|---|---|---|---|
| 6,089,889 A * | 7/2000 | Chiou et al. | ................... | 439/159 |
| 6,162,075 A * | 12/2000 | Hara et al. | ..................... | 439/159 |
| 6,210,188 B1 * | 4/2001 | Chang | ........................... | 439/159 |
| 6,695,637 B1 * | 2/2004 | Liu | ................................. | 439/377 |
| 7,014,118 B1 * | 3/2006 | Ramey et al. | ................. | 235/486 |
| 7,160,129 B2 * | 1/2007 | Yin | ................................. | 439/331 |
| 7,207,814 B2 * | 4/2007 | Chen et al. | .................... | 439/159 |
| 7,510,415 B2 * | 3/2009 | Wang | .......................... | 439/159 |
| 7,811,106 B2 * | 10/2010 | Lin et al. | ....................... | 439/159 |
| 2004/0219813 A1 * | 11/2004 | Chang | .......................... | 439/188 |

* cited by examiner

*Primary Examiner* — Thanh Tam Le
(74) *Attorney, Agent, or Firm* — Kilpatrick Townsend & Stockton LLP

(57) ABSTRACT

Connectors that may allow SIM cards to be easily removed and replaced, may be resistant to damage by an improper insertion of a SIM card, and may provide reliable mechanical performance. One example may provide a plunger system where a user can push on a plunger rod and eject a SIM card. Another example may provide contacts that are not damaged by improper insertion of a SIM card. Another example may provide a plastic housing, the housing reinforced by a metallic shield and having a relatively uniform thickness

22 Claims, 5 Drawing Sheets

MINI-SIM CONNECTOR

BACKGROUND

The types of electronic devices that are available to consumers has exploded the past several years, and the rate of introduction of new products shows no signs of abating. In particular, mobile communication devices, such as smart, media, and cell phones, tablet, laptop, and netbook computers, media players, and other devices, have become ubiquitous.

The amount of functionality and connectivity of these devices has also increased. In particular, the ways in which a device can communicate has increased. Many devices now are able to communicate using wired and wireless communication protocols, such as Ethernet, Bluetooth, WiFi, and cellular communications. In particular, many devices now support communications using third and fourth generation (3G and 4G) networks.

3G and 4G networks identify users through subscriber identity module (SIM) cards. Each device on the network may have a SIM card that identifies a user in order to properly route voice and data information to and from the user. These SIM cards may be inserted into an electronic device using a connector.

On occasion, a SIM card may need to be removed by a user. For example, a user may want to remove a SIM card from one device and insert it in another. For this reason, it may be desirable to provide a connector where a user can easily remove and replace a SIM card.

Also, when reinserting the SIM card, a user may insert the SIM card improperly. For example, a user may insert the card upside down or in another inappropriate manner. Therefore, it may be desirable to provide a connector that is resistant to damage by an improper insertion of a SIM card.

The ability to connect to a network, such as a 3G or 4G network, is an important one for many users. As such, it may be important that a connector for a SIM card not fail, but instead provide reliable mechanical performance.

Thus, what is needed are SIM connectors that allow SIM cards to be easily removed and replaced by a user, are resistant to damage by an improper insertion of a SIM card, and provide reliable mechanical performance.

SUMMARY

Accordingly, embodiments of the present invention may provide connectors that allow SIM cards to be easily removed and replaced, may be resistant to damage by an improper insertion of a SIM card, and may provide reliable mechanical performance.

An illustrative embodiment of the present invention may provide connectors that allow SIM cards to be easily removed and replaced. Specifically, a plunger system may be provided where a user can push a plunger rod and eject a SIM card. This card, or a new card, may be easily be reinserted by pushing the card into the connector.

Another illustrative embodiment of the present invention may provide connectors that are resistant to damage by improper insertion of a SIM card by a user. Specifically, internal contacts may be arranged such that they have a low profile. This low profile may enable the contacts to not be damaged during an improper insertion.

Other various embodiments of the present invention may provide for a reliable mechanical performance. One such embodiment may provide a metallic detect switch and contacts. Care may be taken in order to prevent the detect switch and contacts from being shorted. Specifically, one or more portions of the plunger system may be coated or otherwise covered by a nonconductive material. In a specific embodiment of the present invention, the nonconductive material may be polytetrafluoroethylene or Teflon™.

In other embodiments of the present invention, the connector may have a plastic housing. This plastic housing may be formed using injection molding. To improve the mechanical reliability (and manufacturability) of the connector, care may be taken to avoid large variations in the thickness of the housing. To even out the thickness of the housing, various holes or open areas may be formed.

In some of these embodiments of the present invention, a metallic shield may be used for mechanical stability and electromagnetic protection. To further improve the mechanical reliability of the connector, portions of the shield may be inserted into the holes or open areas in the connector housing.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
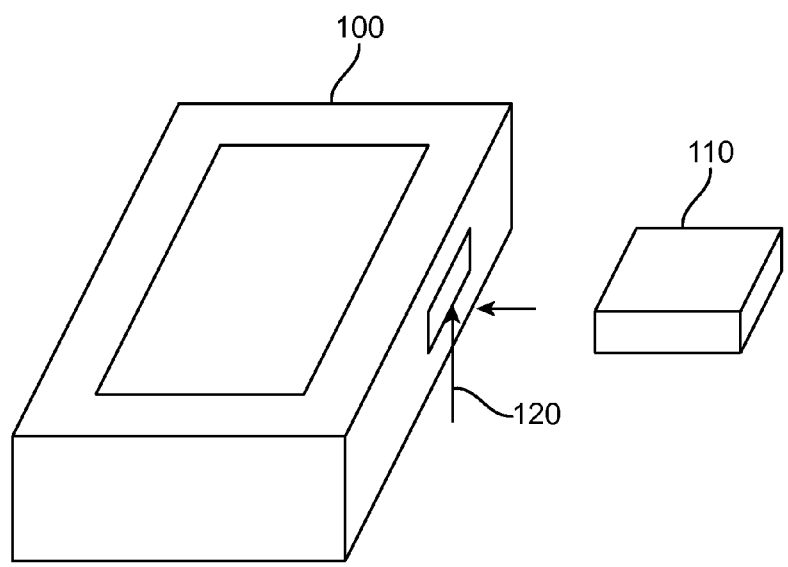
FIG. 1 illustrates an electronic device that is improved by the incorporation of an embodiment of the present invention.

FIG. 1 illustrates an electronic device that is improved by the incorporation of an embodiment of the present invention. This figure includes electronic device 100. Electronic device 100 may be a tablet, netbook, laptop, or other type of computer, cell, media, or smart phone, monitor, media player, or other type of electronic device.

Card 110 may also be included. Card 110 may be a SIM card, mini-SIM card, micro-SIM, or other type of card or electronic device. For example, card 120 may be a micro-SIM card and in a mini-SIM card tray or emulator. Card 110 may be inserted into electronic device 100 using connector 120.

Figure 2:
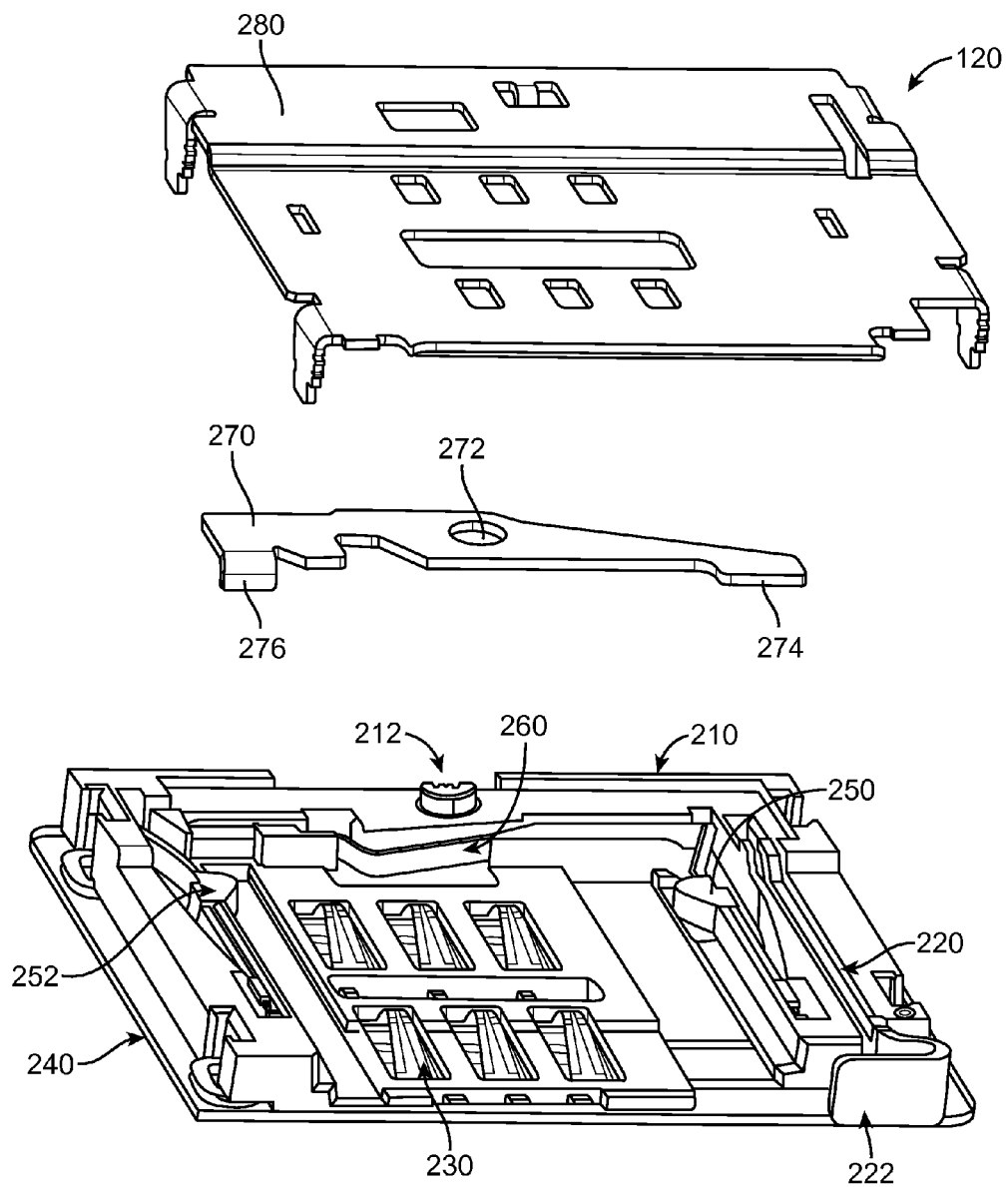
FIG. 2 illustrates portions of a connector according to an embodiment of the present invention.

FIG. 2 illustrates portions of a connector according to an embodiment of the present invention. This figure, as with the other included figures, is shown for illustrative purposes and does not limit either the embodiments of the present invention or the claims. Also, while embodiments of the present invention are particularly suited to SIM card connectors, other connectors may be improved consistent with embodiments of the present invention.

Connector 120 may include housing or tray 210. Housing or tray 210 may be formed using plastic or other insulative material. Housing or tray 210 may include pivot point 212. Lever 270 may include a hole 272, into which pivot point 212 may fit.

Plunger rod 220 may include face 222. Face 222 may provide a point at which a user may apply a force. In a specific embodiment of the present invention, this force may be applied using a paperclip or similar device, where the paperclip is inserted into a hole or opening on a SIM card tray or device housing. This force may push plunger rod 220 towards a back of connector 120. This, in turn, may push point 274 back, thus bringing point 276 of lever 270 forward. Point 276 may push against a SIM card, thus moving it forward and ejecting it from connector 120.

Connector 120 may also include insert detect switch 260, which may open when a SIM card is fully inserted into connector 120.

Connector 120 may further include a shield including a bottom plate 240 and top plate 280 for mechanical stability and electromagnetic shielding. Connector 120 may also include retaining clips 250 and 252 to hold a SIM card or other device securely in place.

Contacts 230 may have a low profile. This may aid contacts 230 from being damaged if a SIM card is inserted into connector 120 in an upside down or otherwise improper manner.

Figure 3:
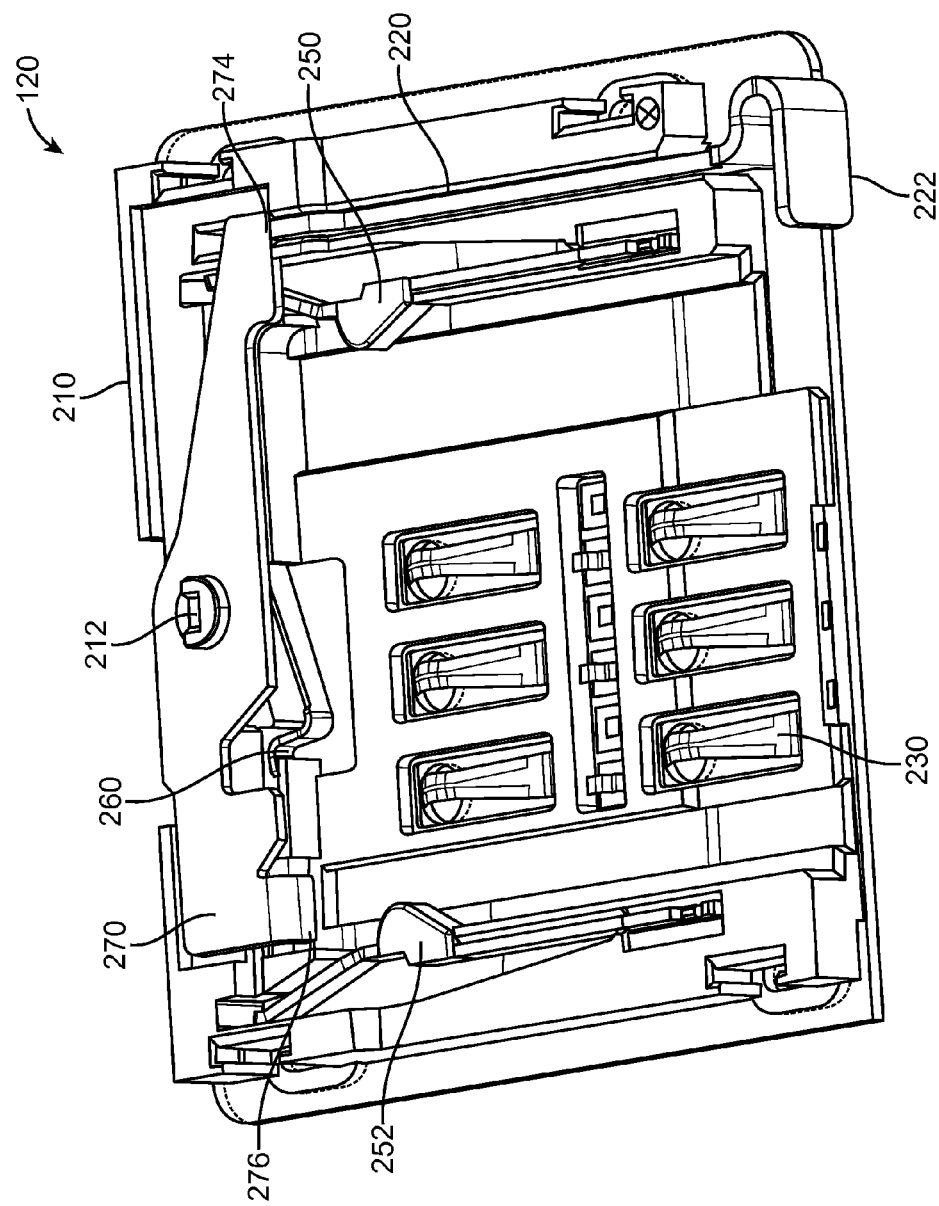
FIG. 3 illustrates another view of a connector according to an embodiment of the present invention.

FIG. 3 illustrates another view of a connector according to an embodiment of the present invention. Again, face 222 may receive a force from a user. This force may push plunger rod 220 of lever 270 at point 274. Lever 270 may rotate about pivot point 212. This may push face 274 into a SIM card in connector 120, thus ejecting it. Connector 120 may include retaining clips 250 and 252, as well as contacts 230.

Figure 4:
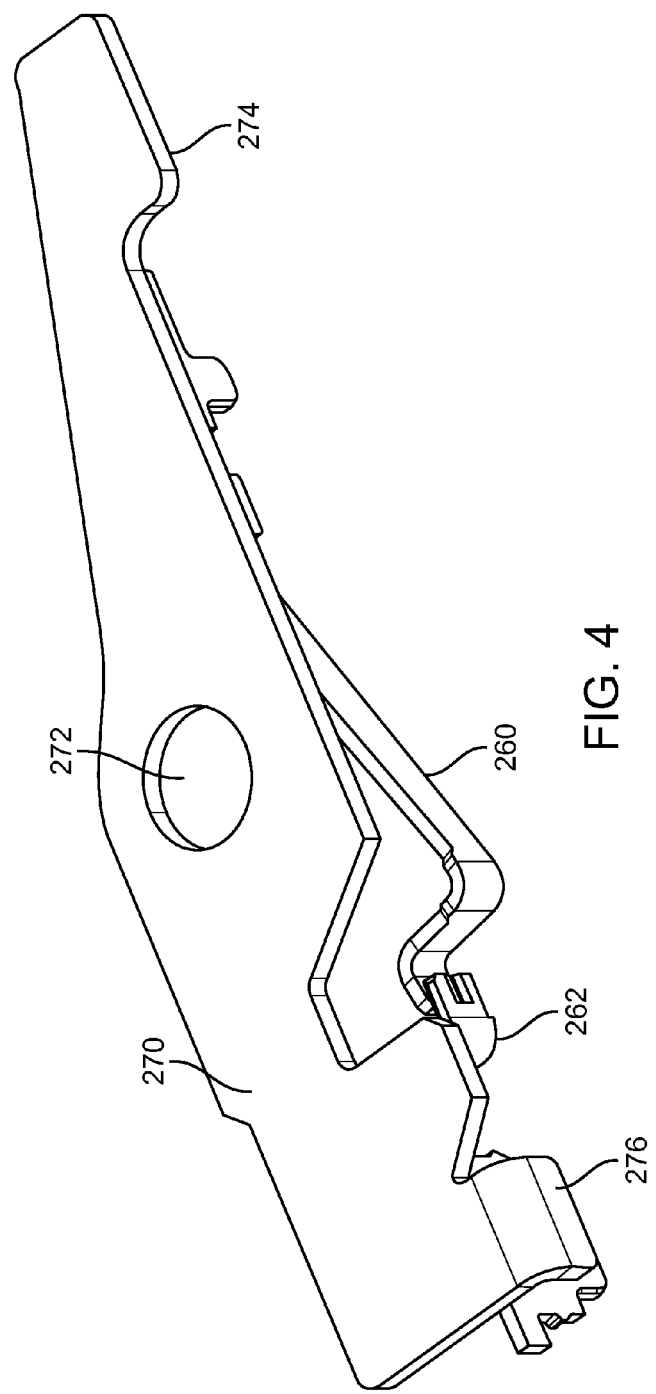
FIG. 4 illustrates a more detailed view of a lever and detect switch according to an embodiment of the present invention.

FIG. 4 illustrates a more detailed view of a lever and detect switch according to an embodiment of the present invention. Again, a force from user may be applied through a pushrod 220 to lever portion 274. This may cause lever 270 to rotate about hole 272, such that point 276 pushes a SIM card out of the connector. Insert detect switch 260 may be disconnected from switch point 262 when a SIM card is inserted. In this way, an open circuit between insert detect switch 260 and contact point 262 may be detected and used to determine that a SIM card has been inserted into connector 120.

In various embodiments of the present invention, it may be desirable that detect insert switch 260 and contact point 262 are not accidentally shorted together by lever 270. Accordingly, embodiments of the present invention may coat lever 270 with a nonconductive material. In an embodiment of the present invention, this coating may be polytetrafluoroethylene or Teflon™. In other embodiments of the present invention, lever 270 may be coated with other materials, or it may be made from a nonconductive material.

In a specific embodiment of the present invention, housing 210 may be formed using injection molding. In this case, it may be desirable for the plastic of housing or tray 210 to have a uniform thickness. This uniformity avoids hotspots and cool spots that can lead to unreliable manufacturing of housing 210. Accordingly, where housing 210 may be thicker, an opening or cavity may be used. This opening or cavity may improve the uniformity of the thickness of housing 210. This opening may in turn be reinforced with a portion of shield portions 240 or 280. An example is shown in the following figure.

Figure 5:
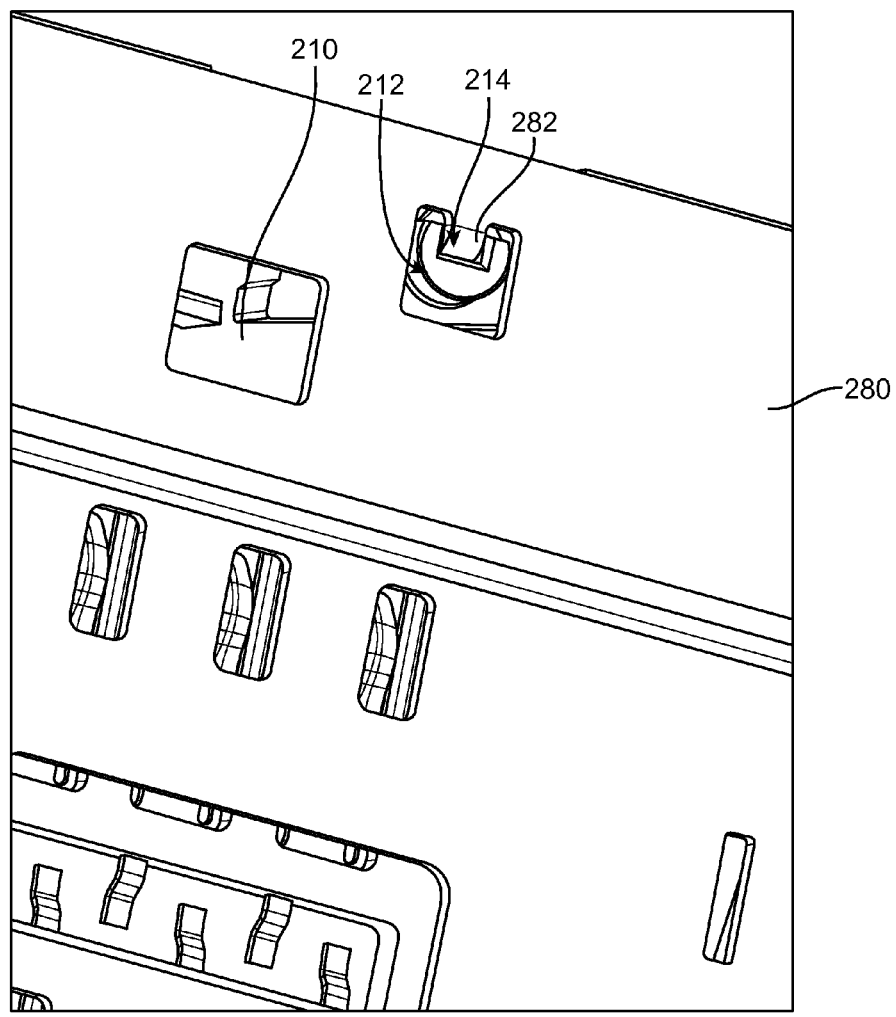
FIG. 5 illustrates a portion of a shield and housing for a connector according to an embodiment of the present invention.

FIG. 5 illustrates a portion of a shield and housing for a connector according to an embodiment of the present invention. Housing 210 may include pivot point 212. Pivot point 212 may include opening 214. Shield portion 282 of shield 280 may be bent to fit into opening 214. In this way, the thickness of housing 210 is made more uniform, and may also be reinforced by shield portion 282.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector to accept a Subscriber Identity Module (SIM) card, the connector comprising:
   a plastic housing;
   a plunger rod;
   a lever connected to the plunger rod, the lever to pivot about an axis point, the axis point formed as part of the plastic housing, wherein the axis point comprises an opening;
   a plurality of contacts;
   a first retaining clip on a first side of the connector and a second retaining clip on a second side of the connector, the first retaining clip and the second retaining clip to hold the SIM card in the connector; and
   a shield, wherein the shield is metallic and a portion of the shield is bent to fit in the opening of the axis point.

2. The connector of claim 1 wherein the plunger rod comprises a substantially flat face.

3. The connector of claim 2 wherein the substantially flat face is arranged to accept a force provided by a user.

4. The connector of claim 3 wherein the force is provided by a user to eject a SIM card from the connector.

5. The connector of claim 1 wherein the lever is coated with a nonconductive layer.

6. The connector of claim 5 wherein the nonconductive layer is formed using polytetrafluoroethylene.

7. The connector of claim 1 wherein the plurality of contacts each have a substantially low profile.

8. The connector of claim 1 further comprising a detect switch to be in a first state when a SIM card is fully inserted in the connector.

9. The connector of claim 8 wherein the first state is open.

10. A connector to accept a Subscriber Identity Module (SIM) card, the connector comprising:
    a plunger rod;
    a lever connected to the plunger rod, the lever to pivot about an axis point, the lever at least substantially coated with a nonconductive material;
    a plurality of contacts;
    a first retaining clip on a first side of the connector and a second retaining clip on a second side of the connector; and
    a detect switch located substantially under the lever such that the nonconductive material coating the lever provides an insulating layer between the detect switch and the lever, the detect switch to detect when a SIM card is fully inserted in the connector.

11. The connector of claim 10 further wherein the first retaining clip and the second retaining clip hold the SIM card in the connector.

12. The connector of claim 10 wherein the detect switch is in a first state when a SIM card is fully inserted in the connector.

13. The connector of claim 12 wherein the first state is open.

14. The connector of claim 10 wherein the plunger rod comprises a substantially flat face.

15. The connector of claim 13 wherein the substantially flat face is arranged to accept a force provided by a user.

16. The connector of claim 10 wherein the nonconductive layer is formed using polytetrafluoroethylene.

17. A connector to accept a Subscriber Identity Module (SIM) card, the connector comprising:
   a plastic housing;
   a plunger rod;
   a lever connected to the plunger rod, the lever to pivot about an axis point, the axis point formed as part of the plastic housing, the axis point having an opening;
   a shield, wherein a portion of the shield is arranged to fit in the opening of the axis point;
   a plurality of contacts; and
   a first retaining clip on a first side of the connector and a second retaining clip on a second side of the connector.

18. The connector of claim 17 further wherein the first retaining clip and the second retaining clip hold the SIM card in the connector.

19. The connector of claim 17 further comprising a detect switch to detect when a SIM card is fully inserted in the connector.

20. The connector of claim 17 wherein the lever is coated with a nonconductive layer.

21. The connector of claim 20 wherein the nonconductive layer is formed using polytetrafluoroethylene.

22. The connector of claim 17 wherein the shield is metallic.

* * * * *